(12) United States Patent
Lin

(10) Patent No.: US 10,068,094 B2
(45) Date of Patent: Sep. 4, 2018

(54) SYSTEM AND METHOD FOR TRACING DATA ACCESS AND DETECTING ABNORMALITY IN THE SAME

(71) Applicant: Datiphy Inc., San Jose, CA (US)

(72) Inventor: Yeejang James Lin, San Jose, CA (US)

(73) Assignee: Datiphy Inc., San Jose, CA (US)

( * ) Notice: Subject to any disclaimer, the term of this patent is extended or adjusted under 35 U.S.C. 154(b) by 241 days.

(21) Appl. No.: 14/990,399

(22) Filed: Jan. 7, 2016

(65) Prior Publication Data

US 2017/0200011 A1    Jul. 13, 2017

(51) Int. Cl.
 G06F 21/00    (2013.01)
 G06F 21/57    (2013.01)
 G06F 21/62    (2013.01)

(52) U.S. Cl.
 CPC ........ G06F 21/577 (2013.01); G06F 21/6218 (2013.01)

(58) Field of Classification Search
 CPC ....... H04L 63/102; H04L 63/20; H04L 63/08; H04L 63/1433; H04L 63/1416; H04L 63/1408; H04L 63/1441; H04L 43/00; H04L 67/22
 See application file for complete search history.

(56) References Cited

U.S. PATENT DOCUMENTS

| | | | | |
|---|---|---|---|---|
| 8,584,219 | B1 * | 11/2013 | Toole | ...................... G06F 21/60 726/25 |
| 2015/0281287 | A1 * | 10/2015 | Gill | ........................ G06F 21/55 726/1 |
| 2016/0004862 | A1 * | 1/2016 | Almehmadi | .......... G06F 21/552 726/25 |

* cited by examiner

*Primary Examiner* — Ghazal Shehni
(74) *Attorney, Agent, or Firm* — Wang Law Firm, Inc.

(57) ABSTRACT

Data DNA modeling is used to represent data and the relationship this data has with other data. When an information access request from a user is detected, an asset DNA associated with the user is retrieved and analyzed against the information access request. Using the asset DNA, it can be determined whether the information access request is a normal request or a suspicious request. If the user is unknown, a generic asset DNA can be created and populated with the data from the information access request. The system checks the newly created asset DNA against other similar asset DNA to determine whether there is any abnormality associated with this newly created asset DNA.

20 Claims, 11 Drawing Sheets

700

702

| Time: 2015-04-15:09:19:12.234567 Session ID: 123456678990 |
| Connection: 10.0.0.2:1234 ->10.10.1.2:1512, Sequence: 10 |

| DB Servers: 10.10.1.2 Oracle | DB Clients: 10.0.0.2 | client user: root client host: win123 program: sqlplus | App User: Peter App Tag: 34567 |
|---|---|---|---|
| DB User: Peter New Relation: db, program, class | query: update empl set a=123, b=456, c=789 where x=123 and 1=1 | | Level: High Rules: update, sqlerrors, sqlinjection |
| | Variables: 123, 456, 789 | | Response Time: 1 s Transaction Time: Query Size: Response Size: Row Count: |
| New Assets : class, table, column | response: ora-12345: failed to update | | |
| class: 1234567 cmd: update db: master table: empl | Columns: a, b, c Value: 123, 456, 789 where: x | SQL Warning: Type1 (1=1) | Signatures: credit card: 123, 456, 789 |

FIG. 7

SYSTEM AND METHOD FOR TRACING DATA ACCESS AND DETECTING ABNORMALITY IN THE SAME

BACKGROUND OF THE INVENTION

1. Field of the Invention

The present invention generally relates to data security, and more specifically, relates to a system and method that detect abnormality in data access.

2. Description of the Related Art

Information is becoming most valuable asset for any company in today's business world and consequently the need to protect the information is of paramount importance for every company. Before the information can be protected, the information owners need to know who are accessing and using the information and how the information is accessed. Only by knowing how the information is accessed, it is possible to detect abnormalities in a system through which the information is accessed. However, with millions of data access requests that go through the system each day, the amount of data that needs to be collected and analyzed overwhelms any system designed to track and protect the data in an information system, especially when the data collected seem unrelated to each other.

Therefore, there is a need for a system and method that correlate collected data and detect abnormality in data access transactions, and it is to this system the present invention is primarily directed to.

SUMMARY OF THE INVENTION

The system of the present invention provides an easy way to trace data access and to detect abnormality related to data access. In one embodiment, the present invention provides a method for identifying risks associated with information access requests in a system, by an apparatus comprising a monitoring unit, a non-volatile computer-readable memory, and a control unit. The method comprises receiving, by the monitoring unit, an information access request, determining, by the control unit, whether the information access request involves a known entity or a new entity, retrieving, from the non-volatile computer-readable memory, a first set of data related to the known entity if the information access request involves a known entity, comparing the first set of data with data related to the information access request, creating deviation data if the first set of data differs from the data related to the information access request, and increasing a risk level associated with the deviation data if the deviation data exceeds a predefined trigger level in a policy.

In another embodiment, there is provided an apparatus, for identifying risks associated with information access requests in a system. The apparatus comprises a network interface unit in communication with a network, a monitoring unit network in communication with the network interface and receiving information access request from the network, a control unit, and a non-volatile computer-readable memory in communication with the monitoring unit. The control unit determines whether the information access request involves a known entity or a new entity, retrieves from the non-volatile computer-readable memory, a first set of data related to the known entity if the information access request involves a known entity, compares the first set of data with data related to the information access request, creates deviation data if the first set of data differs from the data related to the information access request, and increases a risk level associated with the deviation data if the deviation data exceeds a predefined trigger level in a policy.

In yet another embodiment, there is also provided a non-transitory computer readable medium on which is stored a computer program for identifying risks associated with information access requests in a system. The computer program comprises computer instructions that when executed by a computing device with a monitoring unit, a non-volatile computer-readable memory, and a control unit causes the computing device to perform the steps for receiving, by the monitoring unit, an information access request, determining, by the control unit, whether the information access request involves a known entity or a new entity, retrieving, from the non-volatile computer-readable memory, a first set of data related to the known entity if the information access request involves a known entity, comparing the first set of data with data related to the information access request, creating deviation data if the first set of data differs from the data related to the information access request, and increasing a risk level associated with the deviation data if the deviation data exceeds a predefined trigger level in a policy.

The present system and methods are therefore advantageous as they enable identification of abnormality in data access from a system's perspective. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which:

FIG. 7 illustrates data associated with an event DNA;

DETAIL DESCRIPTION OF THE INVENTION

In this description, the term "application" as used herein is intended to encompass executable and non-executable software files, raw data, aggregated data, patches, and other code segments. The term "exemplary" is meant only as an example, and does not indicate any preference for the embodiment or elements described. Further, like numerals refer to like elements throughout the several views, and the articles "a" and "the" includes plural references, unless otherwise specified in the description. The terms "system"

and "network" are used interchangeably and the terms "data" and "information" are also used interchangeably unless otherwise stated.

Figure 1:
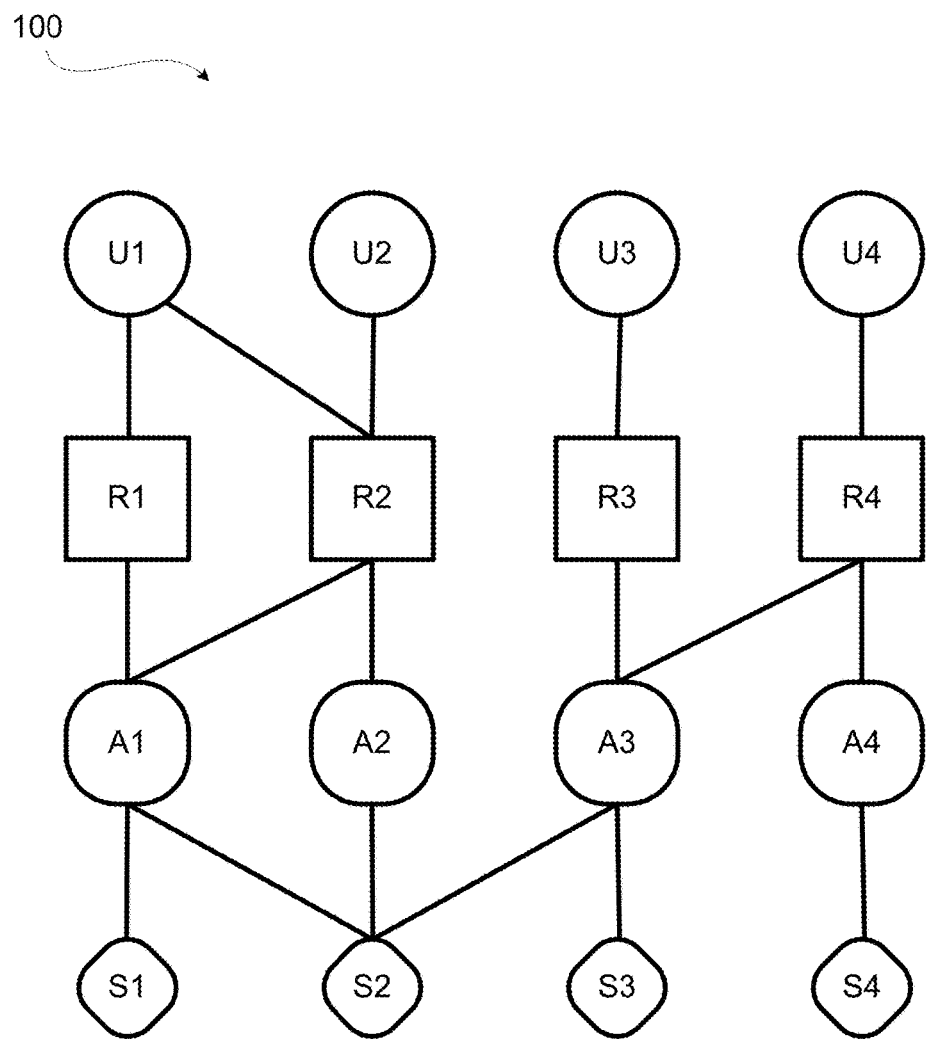
FIG. 1 depicts a data access scenario 100 of multiple users accessing multiple data.

In an overview, the present invention provides a system and method for correlating data collected in a system and identifying abnormalities in data access to the system. FIG. 1 is a simple illustration 100 of different elements involved in data access operations in a system. Multiple users $U_n$ may access information stored in one or more servers $S_n$. A user U1 may request data stored on a server S1 through an action A1 that follows a rule (policy) R1; the user U1 may also use the same command (action) A1, following the same rule R1, to access another data stored on another server S2. Similarly, user U2 may request a piece of information stored on the server S2 through a command A2 that follows a rule R2. The same information request from the user U2 can also be made by invoking the command A1 using the rule R2.

The above description reflects a common scenario in today's business world, where an employee Adam can access a design data X stored on a server S1 while working on his computer in his office and also can continue to work, using the same design data X, from his home computer. The design data X may also be accessed by another employee Bob who uses his laptop computer to access the design data X while on a business trip.

As illustrated, in today's business world, one piece of information may be accessed by different users at different times by different methods and one user may also access use different methods to access different data from different locations. In order to track the information related to these data access, a tracking and monitoring system needs to track each action and store information associated with each action. This tracking and monitoring operation creates a huge amount of data that are related to each other.

To easily track and understand the data collected by the tracking and monitoring system, the present invention introduces a concept of data DNA. The data DNA is a set of data representing a data model based on the concept of molecule formed by atoms and bonds and this data mode enables users to easily describe data access, data transactions, and data activities. The data DNA model also enables users to discover and manage data elements (atoms) and interactions (bonds) between them during a data access. The methods based on this data DNA model enable auditing, regulating data access and access behaviors. These access behaviors can be changed by rules and actions from the users. By using the methods of the present invention, business needs for data audit, data security, data forensics, data asset management, and data analytics can be easily accomplished.

The data DNA model is useful to describe data, data assets, data activities, data policies, data transactions, data events, data risks, and data life cycle. Under this data DNA model, several related models can be derived, such as asset DNA, event DNA, rule DNA, etc. The asset DNA may be used to describe data asset, data asset group, or data asset type, in terms of atoms and bonds. The event DNA may be used to describe data activity or collection of data activities also in terms of atoms and bonds.

In the data DNA model, atom is a basic building block and may refer to assets, rules, and actions. Assets may include servers, clients, users, databases, tables, columns, data signatures, conditions, errors, etc. Rules are generally defined and/or configured by users. Actions are also defined and/or configured by users. Another basic building block is bond and bond refers to the relationships between atoms, such as the relationship between a database (DB) user and a server, a database, a client program, a data signature, rules, actions, . . . Bond may be used to detect "vibrations" in the data model and this reflects to deviations in data behavior.

Figure 2:
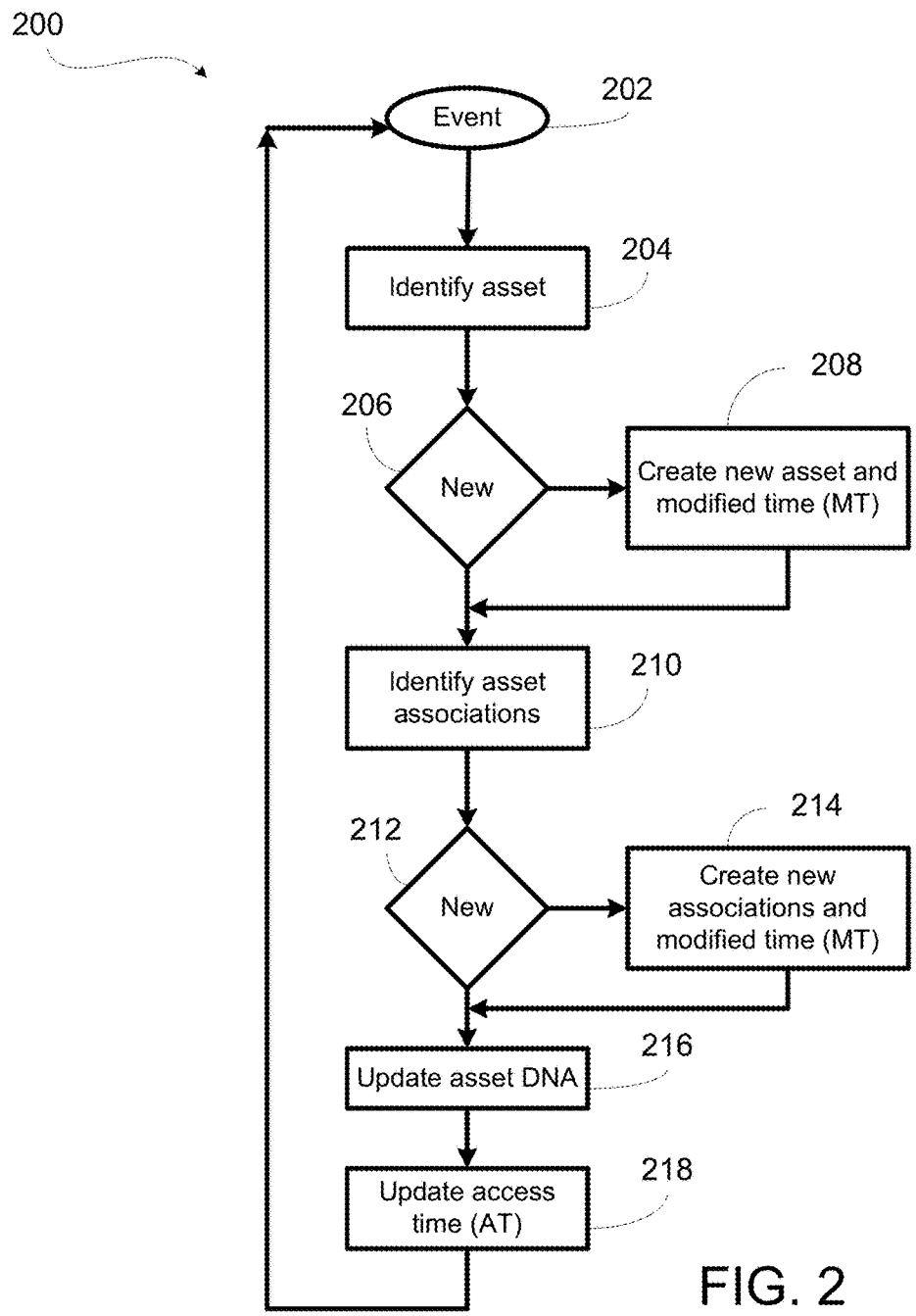
FIG. 2 depicts a flowchart 200 of a process executed by a system for handling a new asset.

Under the data DNA model, a clear and concise understanding of data can be achieved easily and data can also be easily managed. In the data DNA model, assets are the building blocks to form an access and the asset may include:
  Servers, Clients
  App User, DB Users, Programs, OS Accounts, Client Hosts, Language, Charset
  Method—Commands and Command Statement
  Read, write, select, insert, update, exec, etc.
  Objects—Data Containers, DB, Tables, Columns, Conditions
  Contents—signatures, patterns
  Results—outputs and Errors
  Policies—defined by users
  Actions—defined by users
  Groups—defined by users Asset DNAs are formed by a "central" asset and associations with other assets. FIG. 2 is a flowchart 200 of a process executed by a system for handling a new asset. When an event is detected, step 202, the system identifies the type of the event, step 204, i.e., whether the event relates to a new user, an access command, an object, etc. The system also determines whether the event refers to any new asset, step 206. If the event refers to a new asset, for example, a new user, then a new set of data is created to represent this new user asset and a time of creation (modified time) is recorded, step 208. The asset may also not to be new. For example, the user may be an existing user. After the asset is created, the system checks whether there is new association associated with the asset created, step 210. An association is a relationship with other assets. If there are new associations, step 212, for example, a user accessing records in a database never accessed before, the new associations will be created and the creation time is recorded, step 214. The asset associations may also be existing, not new. For example, a known user accessing a record that he has accessed before in a manner that he has done before; the asset and the asset associations would not be new. After the asset is identified and new associations are identified, the asset DNA for this asset is updated, step 216, and the access time is also updated 218.

Figure 3:
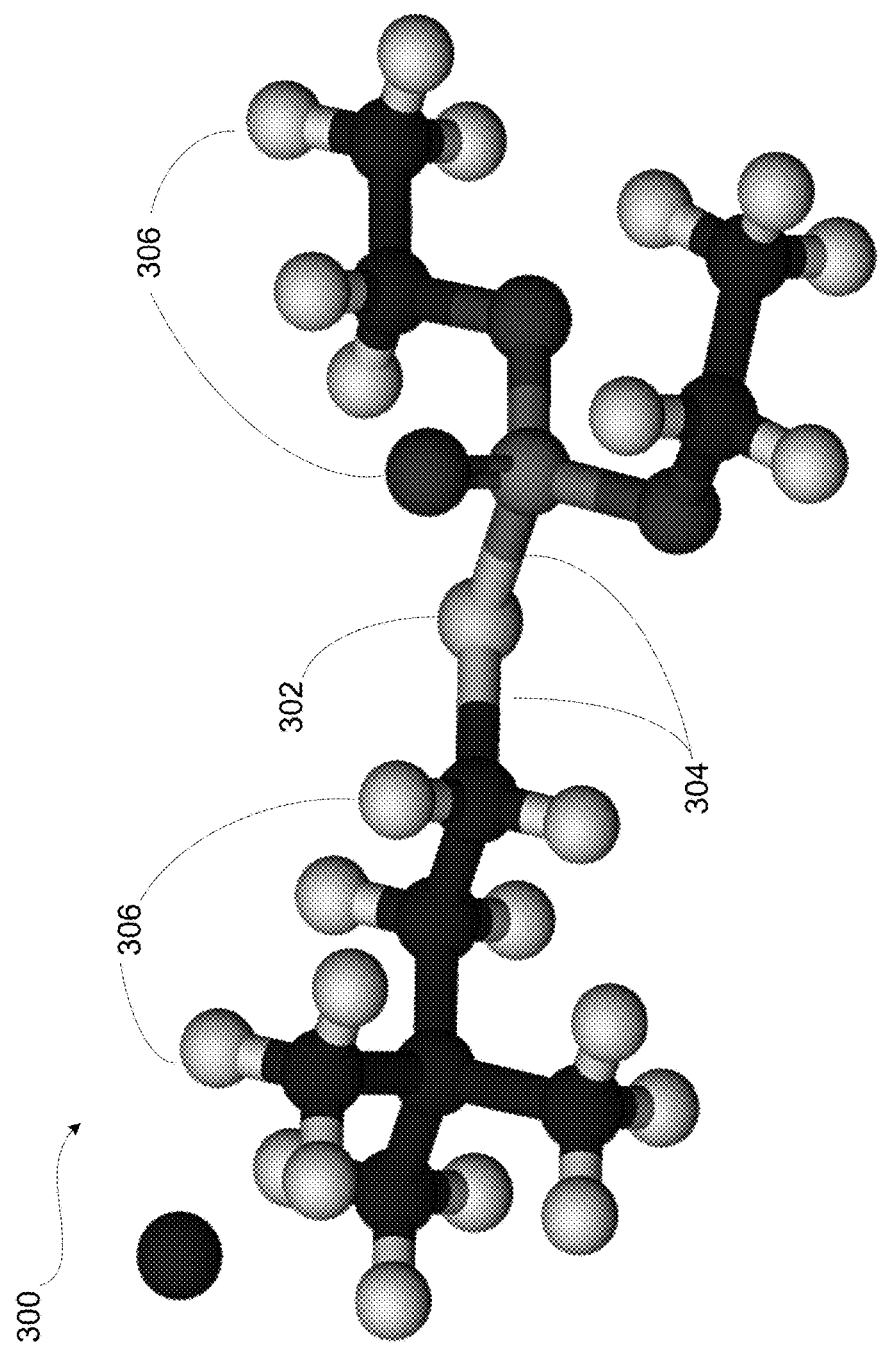
FIG. 3 depicts a data DNA model.

The Data DNA model for the asset DNA 300 can be easily visualized with a model shown in FIG. 3. Atom 302 represents a central asset for the asset DNA 300. The relationships are the links 304 between atom 302 and other atoms 306. The asset DNA 300 refers to a central asset 302 and its relationship with other assets 306.

The asset DNA to forms a baseline for each individual asset and any combination of assets, also known as an asset group. An asset group is a group of assets of the same asset type. By auditing changes of asset DNA, anomalies such as new associations and new assets can be easily detected. Rules and actions in a system can also be treated like assets and this flexibility enhances the security surveillance in the system. Under the asset DNA, rules and action are also treated like assets. For example, access rules, content rules, signatures, behavior rules, and actions are all considered as asset DNA. The asset DNA enables security surveillance to view data from different views and from perspective of different assets or combination of assets as shown in the following description for FIGS. 4-6.

Figure 4:
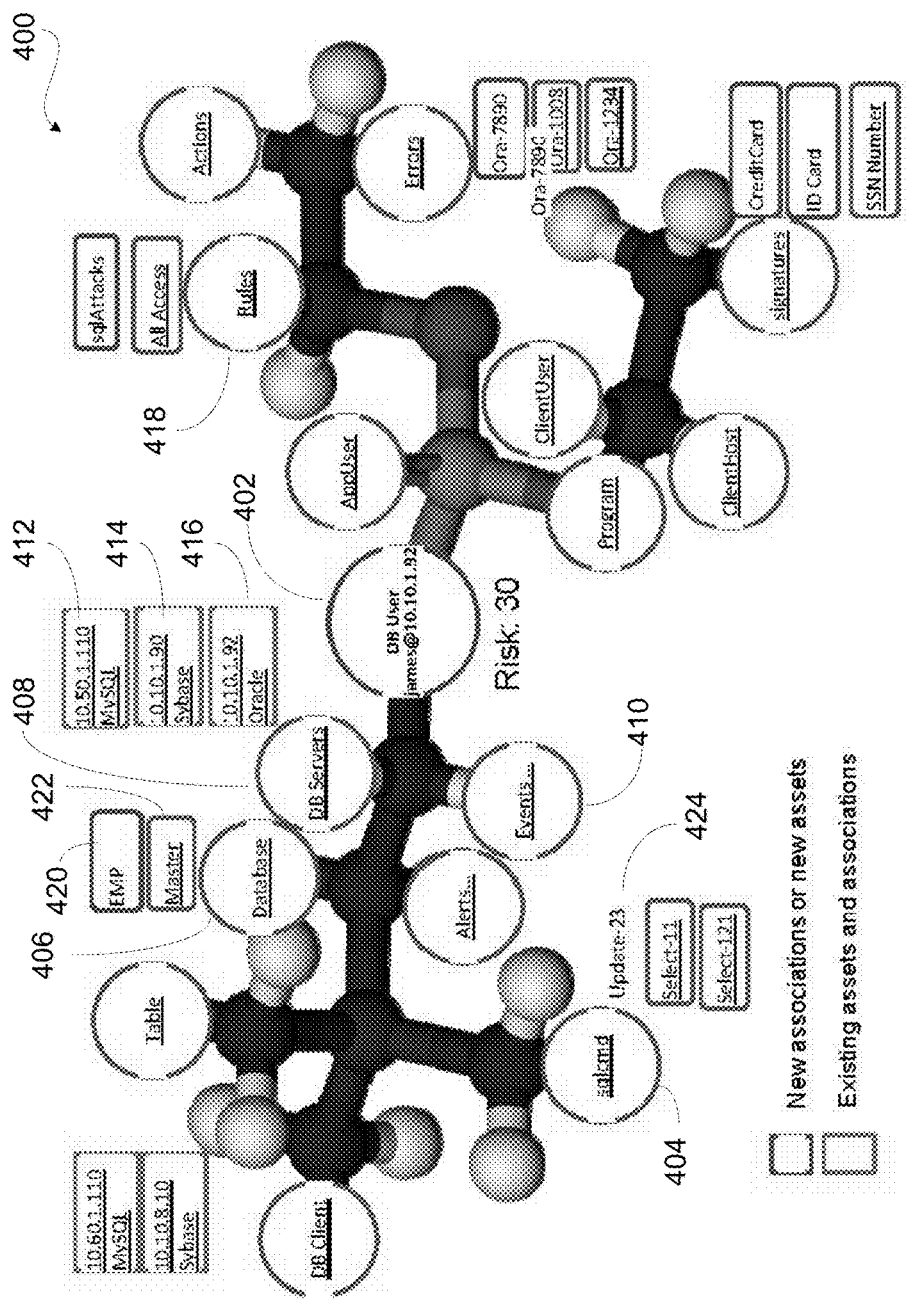
FIG. 4 illustrates an asset DNA when the asset is a user.

An application of the data DNA model for user James is an asset DNA 400 illustrated in FIG. 4. The asset DNA 400 is also known as a user DNA for user James and the central asset 402 is the database user James. The user James can perform many functions within the system and thus maintains relationship with many other assets. For example, user James can access a record in a database located in a database server. The command used by James is an asset 404; the database is another asset 406 and the database server is yet another asset 408. The action of James to access a record is an event, which is also an asset 410.

It is also depicted in FIG. 4 different instances of each asset. For example, for asset 408 (type database server), three instances 412, 414, and 416 are show. Each instance represents a database server that user James 402 has accessed previously. Each command previously invoked by user James 402 is also shown as an instance of the command asset 404 and each rule that applies to every access by user James 402 is also listed as instance of asset 418 for rules. Now, if James 402 uses a previously a new command 424, update-23, to update a data EMP 420, which resides on a previously accessed MySQL server 412, the new command 424 will be added to the list of the commands 404 used by James 402 and the data EMP 420 will also be included into the list of the data accessed by James 420. By using this data DNA model, the user DNA for James does not change but the user DNA for James is updated with new assets (atoms) that are now known to James.

Figure 5:
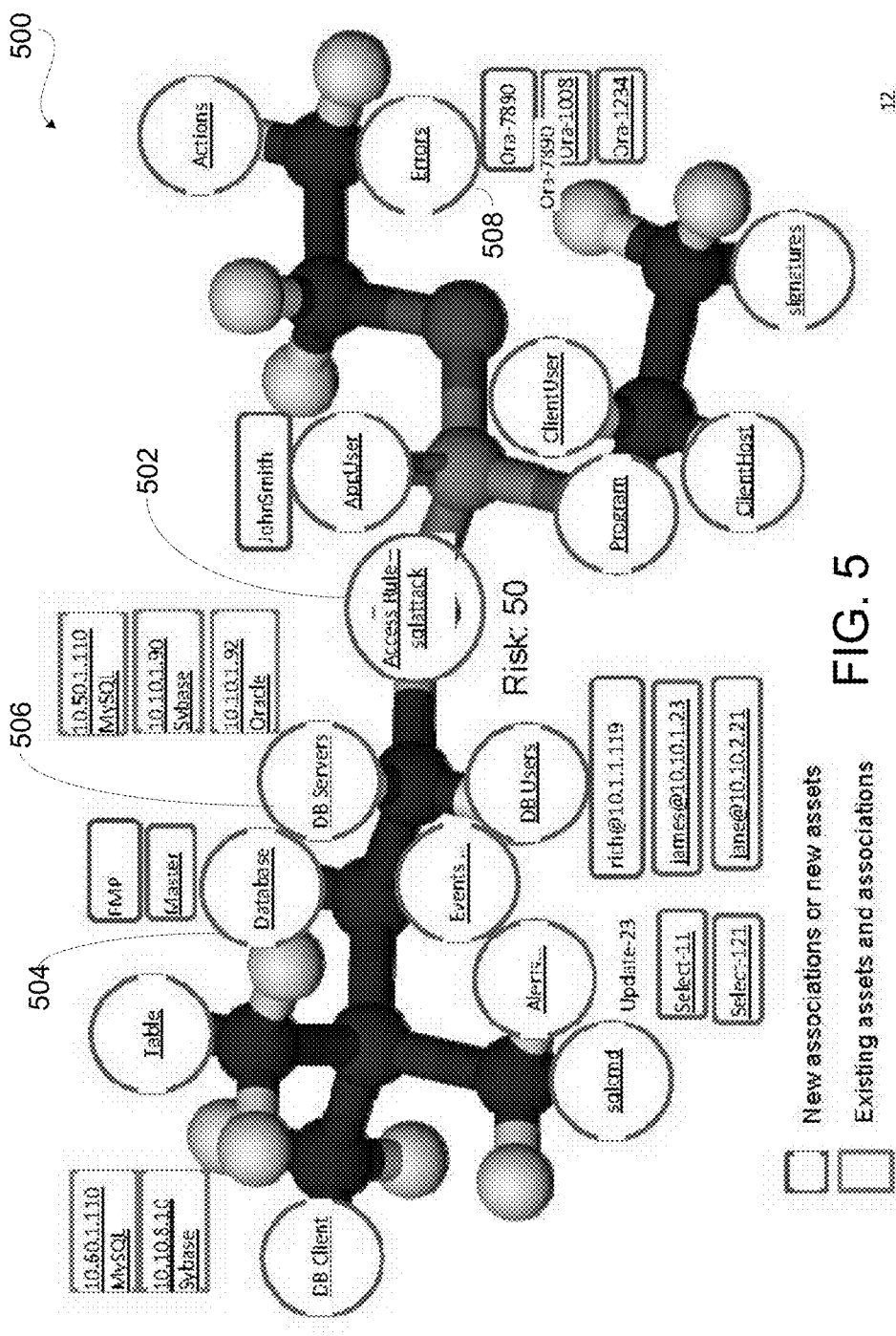
FIG. 5 illustrates an asset DNA when the asset is access rules.

This data DNA model is versatile and can be easily used to represent another asset DNA for a different asset as shown in FIG. 5. Asset DNA 500 shows access rule 502 as the central asset. The access rule 502 may affect how database 504 and database server 506 are accessed, so there are relationship between the access rule 502 and the database 504 and the database server 506. Errors may happen during an access, so asset error 508 is also linked to the access rule 502 and different errors are listed as instances of the asset error 508.

Figure 6:
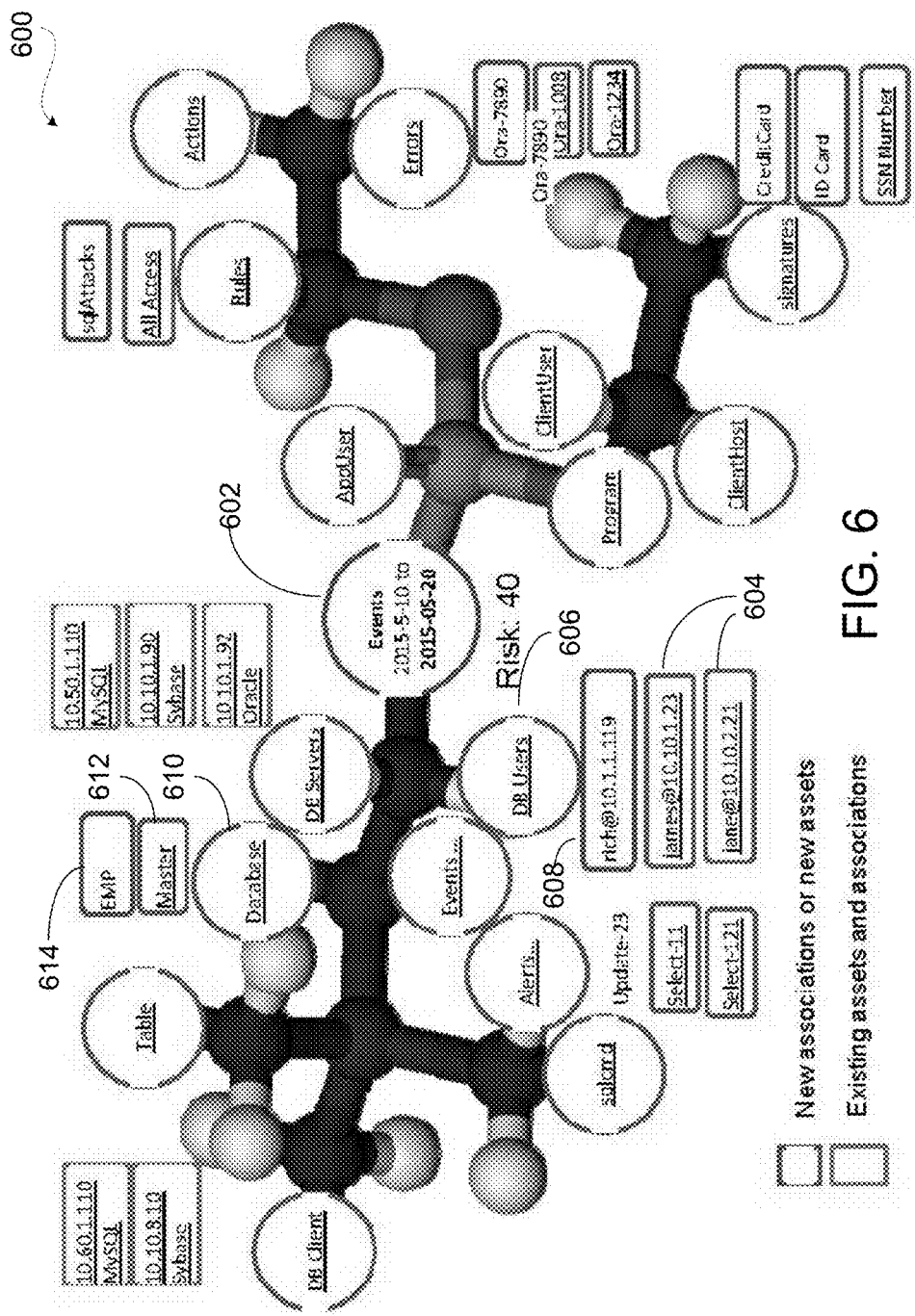
FIG. 6. Illustrates an asset DNA when the asset is events.

FIG. 6 depicts an asset DNA 600 for event asset 602. When an event is detected by the system and the system identifies the event is from a user accessing a database. The system checks whether the user is a known user or a new user. The system checks the user identification against the instances 604 of users from the user asset 606. When the system realizes that the user identification is not listed as one of known instances 604 of the user asset 606, a new instance 608 is created. The system also checks whether the object of the event (database access) is located in a known database 610. When the system realizes the object is not listed as a known instance 612, a new instance 614 in the database asset 610 is created for the object of the access. As shown in FIG. 6, an event DNA can describe one or a collection of events or data activities. By viewing the system from the data activities aspect for given time durations, it can be easily detect what other assets were involved in these event and what risks are involved.

For each asset, an asset DNA similar to those shown in FIGS. 3-6 can be constructed. For example, from FIG. 6, when the new event relates to a new database user, rich@10.1.1.119, this user will have an asset DNA similar to one shown in FIG. 4 and the information related to the event detected, for example database accessed and command (sqlcmd) used, will also show up in the asset DNA for this user. This asset DNA enables the system to predict what other assets this asset may have a relation (connection) and thus making easier to predict what operations harmless and what operations are suspicious. For example, if the asset DNA for user James shows that James accesses database EMP and Master and the database servers often accessed are AAA, BBB, and CCC. If user Rich is of the same user type as James, then an access by Rich to database EMP is less likely to be harmful even if Rich has never accessed database EMP before.

The determination of whether an event is harmful as described above is possible because of the data DNA modeling applied to events. An event (Event DNA) is formed by data DNA and these data DNA can be for data related to who (user identity), what (object), how (user method), where (user location), and when (time). The data DNA can also be for a group of events, assets, rules, and actions. From a collection of events, baseline events can be derived and these baseline events are useful for detection of new and variation events. The variation events are new events and/or events that with new bonds (new relations to other assets) and the variations events can be indications of attacks (malware) or indications of change in user behaviors as described in the above paragraph. Critical events, such as deviations from the baseline events, can be easily detected after applying proper filters. Changes in user behaviors are like DNA mutation that may be an indication of a problem but may also be an indication of a new normal. DNA mutations are candidates for further investigation by the user.

By analyzing DNA mutations, for example analysis of asset deviation, new asset or new association may be detected. This analysis may be done for asset DNA, event DNA, and rule DNA. The DNA mutation may involve one or more variable deviations. One variable mutation enables detection of a new asset or a new association. Multiple variable mutations enable detection of more than one assets or detection of new associations for multiple assets. One example of a single variable mutation is an asset DNA for user James working from his home. James may use a home computer to access data in a server in his office. In this scenario, the user is known, the data has been accessed before, the server has been accessed before, and the only new variable is the location from where James is accessing the data. An example of multiple variable mutations is when James accesses a new data, never accessed before, from his home computer. In this scenario, two new variables are the location and the data.

The data DNA modeling can detect not only anomaly or deviation, but also detect anomaly not easily detectable from one single user perspective. The data DNA modeling enables an easy detection of a system wide attack even each operation may seem to be harmless. For example, if a large number of users start to access a database, at the same time, that are not listed in the database associated with their asset DNA, this may be an indication that the system is not normal and may be under attack, even if individual access of a database by one user may seem harmless. This is a situation that overloads server resources and causes denial of service. Because of the availability of asset DNA for each asset, it is now possible to predict what is normal and what can be expected even it is not shown in the asset DNA.

Figure 8:
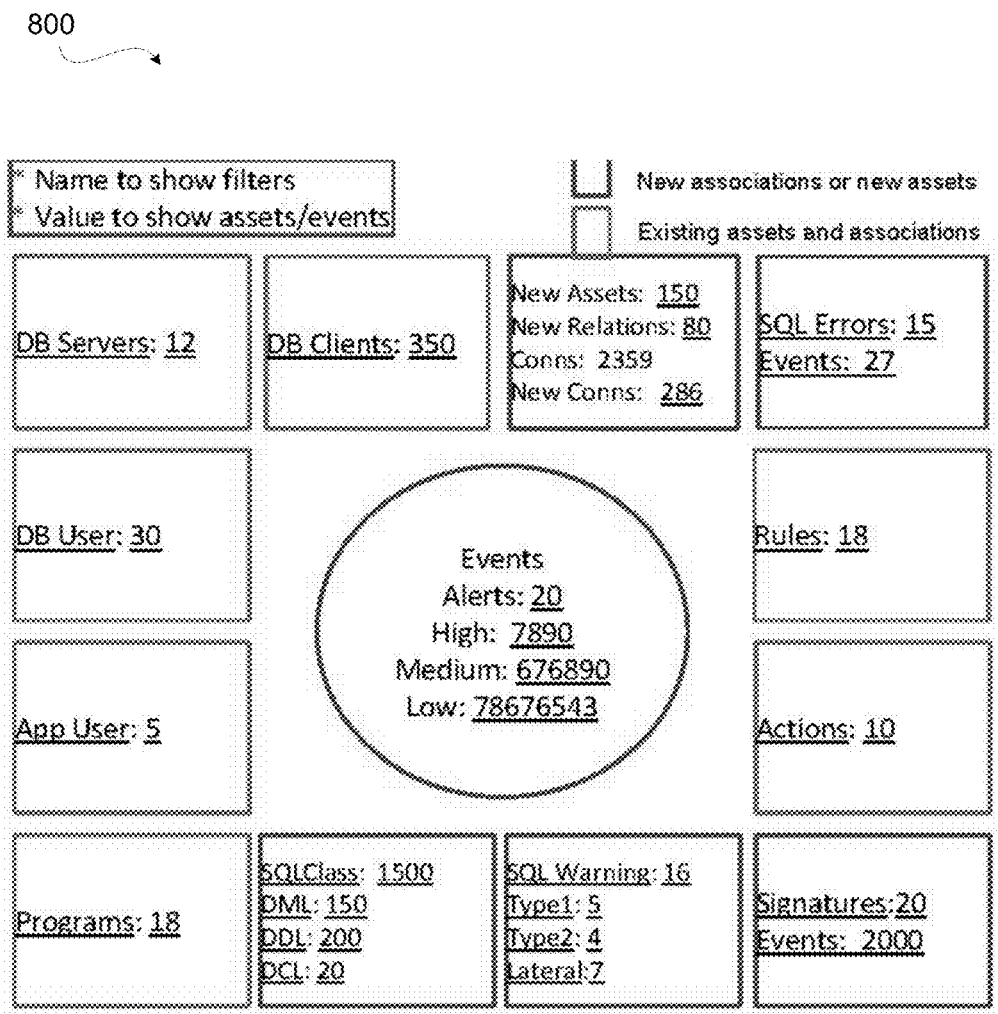
FIG. 8 illustrates an example of a group event DNA.

FIG. 7 is an illustration 700 of data associated with an individual event DNA. The event DNA data 702 such as time of the event and connection are captured. Other data of the event are captured as well. The event DNA as shown in FIG. 7 are repeated for all events detected in the system and the data related to all the events captured and stored. These data can be filtered. FIG. 8 illustrates an example 800 of a group event DNA. This group event DNA is the result of filtering of previously stored data. FIG. 8 is a summary of activities of a group of events in a group event DNA. A group of events is a collection of events, for example of using a set to represent each event:

event1={{a1}, {b1, b2}, {c1, c2, c3}, {d1, d2}}
event2 {{a2}, {b2, b3}, {c2, c3}, {d1, d3}}
event3={{a3}, {b1, b3}, {c3, c4}, {d4}}
where {a1, a2, a3, . . . an}, {b1, b2, b3 . . . bn}, {c1, c2, . . . cn}, and {d1, d2, . . . dn}, each represents a set of assets of the same type.

A group event of event1, event2, and event3 is a union of the above event sets, {event1, event2, event3}={{a1, a2, a3}, {b1, b2, b3}, {c1, c2, c3, c4}, {d1, d2, d3, d4}}. A 'new event' is an event set did not exist before.

Similar to the above event sets, a group of assets (of the same type) may be represented asset sets:
asset1={{x1, x2}, {y1, y2, y3}, {z1, z3}}
asset2={{x2, x3}, {y2}, {z2, z3}}
asset3={{x3, x4}, {y3}, {z4}}
where {x1, x2, x3, . . . an}, {y1, y2, y3 . . . bn}, and {z1, z2, . . . zn}, each represents a set of assets of the same type.

A group asset of asset1, asset2, and asset3 is a union of the above asset sets: {asset1, asset2, asset3}={{x1, x2, x3, x4}, {y1, y2, y3}, {z1, z2, z3, z4}}. A 'new asset' is an asset element (atom) which did not exist before. A new asset association' is a new member to the asset set.

The data DNA model of the present invention can be applied to data collected from different data accesses, such as data requests from web services, data requests from applications, and data requests to database. The data can be structure data, such as database, unstructured data, such as files, semi-structured data, such as big data, cloud data, such Dropbox and Google Documents, etc. Because the data DNA model enables data to be viewed from different perspectives, abnormalities, if not detectable from one perspective, can be detected from a different perspective. For example, an asset DNA of an user accessing a table in a database at an evening hour may seem harmless, however, another asset DNA of the access to the same table at the same time from a high number of users will review a possible system wide attack. Normally, a system access can be represented by commands and data involved. From the commands involved, different data DNA can be retrieved. For example, if a request from a web application for a data on a database server, an event data representing this system access can be formed. Other data DNA can also be formed, for example, an application DNA representing the access from the web application and an asset DNA representing the database can be both formed. These asset DNAs can be compared with the asset DNA retrieved for each asset.

By comparing the asset DNA for each asset involved with the system access with the retrieved DNA for the corresponding asset, a deviation, if any, can be observed. The deviations are used to identify any type of attacks (or virus) that may be hidden in the system requests. In the example above, if the system access is a request from a web application to retrieve a user data and there is an anomaly from this system access, the asset DNA for the database and the event DNA for web application can be retrieved. The event DNA from the system access is compared with these two data DNAs and their deviations noted. Anomalies are deviations from an established standard. The deviations are used to identify the type of attack that the system may be under. If the deviation from the asset DNA for the database is type D3 and the deviation from the event DNA for the web application is W5, then the anomaly is identified as W5D3, for example. After knowing and identifying the deviations, the system can then proceed to find a best solution to handle this anomaly. The system may have access to a database with a list of known virus or attacks and W5D3 may be listed as one of the known attacks.

The data DNA modeling also helps to organize the data collected in a system. Normally, the amount of the data collected is huge and it is difficult to capture the data and the relationship between one datum and other data. Because of the data DNA model captures and caches every new data DNA, the relationship between this captured datum and other data is tracked for future references, unless there is a new piece of data that forms a new relationship with this datum.

The data DNA model makes easy to support risk management application. For example, each asset may be assigned a risk factor according to its business value and each rule may also be assigned a risk factor according to its significance. An event risk may be calculated from asset risks and rule risks.

Figure 9:
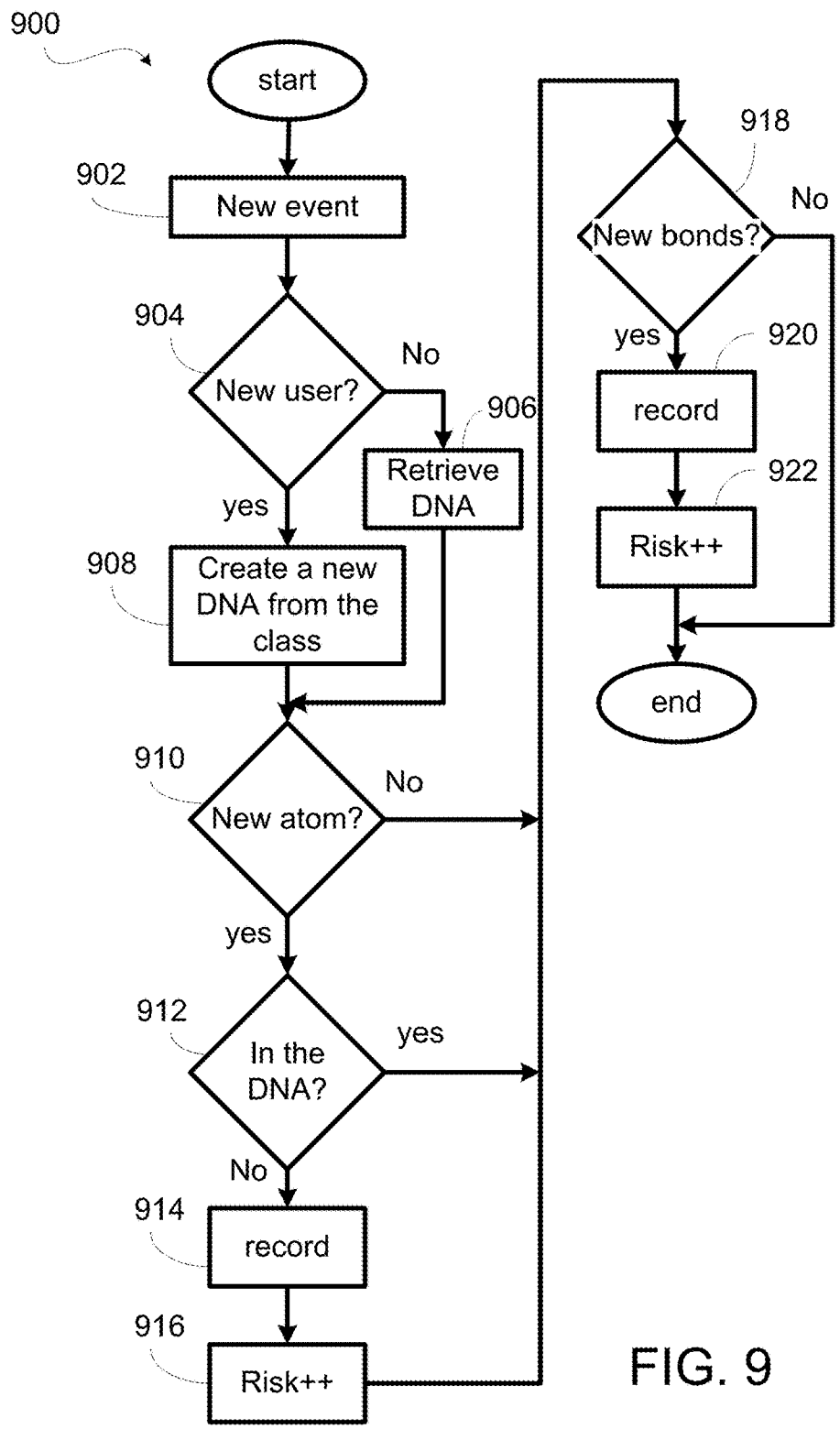
FIG. 9 depicts a flowchart of a process for monitoring activities in a system.

FIG. 9 depicts a flowchart 900 of a process for monitoring activities in a system. When a new event is detected, step 902, the system checks whether it involves a new user, step 904. If the new event relates from a known user, the set of data representing the user DNA associated with the user is retrieved, step 906. If the event is from a new user, a generic user DNA is created, step 908. The generic user DNA includes typical connections to common "atoms," i. e., the generic user DNA has information on the most commonly actions performed by a similar user and most common objects of these actions. This generic user DNA can provide a general idea about the expected behavior of the new user. The generic user DNA is created based on the category of the new user. If the new user is a database administrator, then the generic user DNA will have most common attributes of a database administrator DNA. If the new user is someone working on the human resource department, the generic user DNA created would be different from the generic user DNA for a database administrator.

After the user DNA is either retrieved for the known user or created for a new user, the system proceeds to perform actions substantially similar to these user DNAs. The system checks whether there is any new asset (atom) involved, step 910. If the user is accessing a data that he has not accessed before, this data would be a new asset. This situation is also illustrated in FIG. 4, when user James 402 accesses a new data EMP 420. After detecting the event involves a new asset (a new data), the system checks whether this new asset is part of the generic user DNA, step 912. The new asset is part of the generic user DNA if other user similar to James has accessed this asset before. If the new asset is not part of the generic user DNA, then it will be recorded, step 914, as part of the user DNA for the user. The risk level associated with this event is also increased, step 916, because of the access to a new asset not previously accessed before.

After checking whether the new asset is part of the generic user DNA, the system also check whether the method used to access this asset is new, i.e., if there is a new bond (aka, a new relationship) between user James and this new asset, step 918. If the method is new, i.e., there is a new bond, then this method is recorded for James' user DNA, step 920, and the risk level is further increased, step 922. The step 918 is done by comparing the method used with the methods recorded in James' user DNA. If the event detected in step 902 is from a new user and consequently the generic user DNA is used, the checking of the new bond is done by checking the method against the methods listed in the generic user DNA, which are the most common methods used by users of similar qualifications.

The process described in FIG. 9 is applicable for other assets, such as server, database, etc. and also helps to predict the risk level of a new asset. When a new asset is detected, a generic asset DNA can be used to predict what relationships are likely to be accepted for this new asset and consequently the risk level can be predicted.

Figure 10:
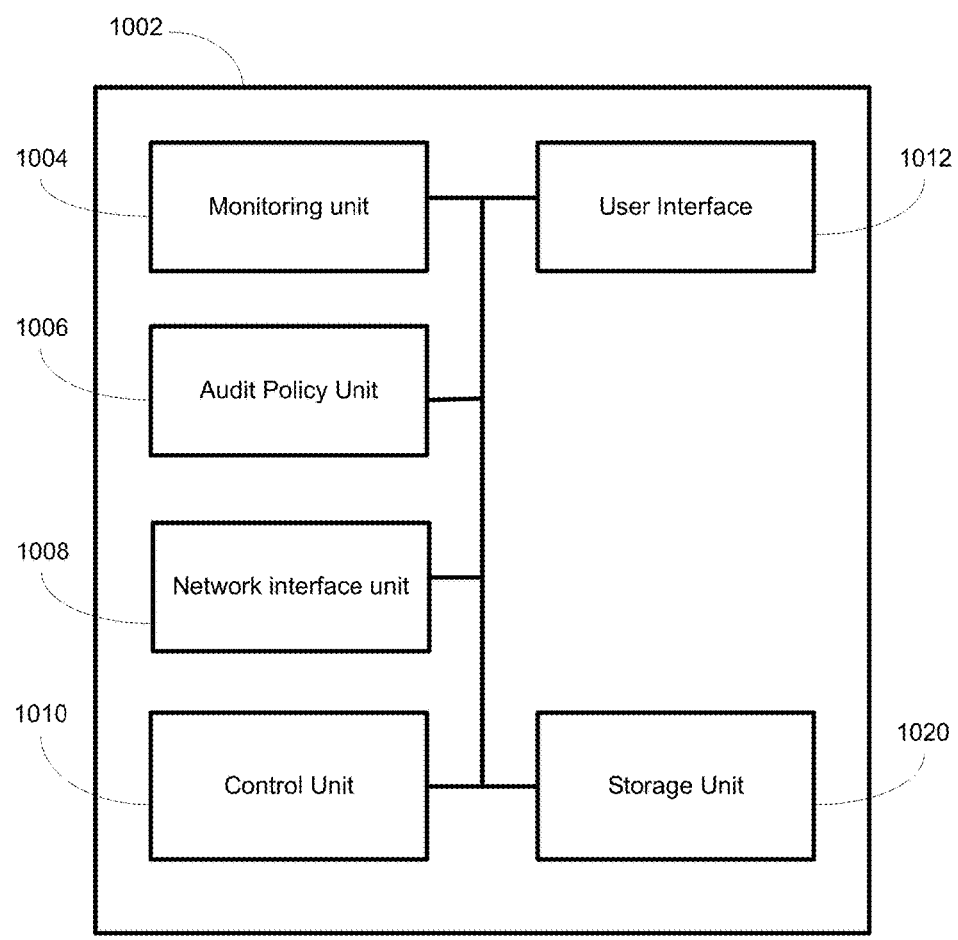
FIG. 10 illustrates an apparatus according to one embodiment of the present invention.

FIG. 10 illustrates an apparatus 1002 according to one embodiment of the present invention. The apparatus 1002 connects to a network through a network interface unit 1008 and monitors access requests, through a monitoring unit 1004, to one or multiple data servers connected to the network. When an access request is detected, the control unit 1010 checks whether the access request involves a known asset or an existing asset, i.e., whether the access request is from a known user or directed toward a known database on a known server, by checking the asset database stored in the storage unit 1020. The storage unit 1020 is a non-volatile computer-readable memory unit and may be internal or external to the apparatus 1002. The storage unit 1020 stores computer programs that, when executed by the control unit 101, enables the apparatus 1002 to perform functions described in this specification. The control unit 101 will identify from the access request all the associations for the asset and these associations are checked against the asset DNA for the asset. The apparatus 1002 also includes an audit policy unit 1006 for storing audit policy entered by user through a user interface 1012. The audit policy is used by the apparatus 1002 to audit the access requests collected from the network and also stored in the storage unit 1020. When abnormalities are detected, alerts will be issued by the control unit 1010.

Apparatus 1002 of the present invention can enhance data security through the data DNA modeling. The data DNA modeling enables representation of not only individual asset but also group asset. When a user accesses a data in a database server from his residence at a night time, the user DNA for this user is retrieved and checked. This access may be done by a known user to a data that he has accessed before, so no alert is noted. The same access can also be view from the database server perspective. The database server DNA for the database server can be retrieved and checked. If the database server DNA shows multiple users accessing the same data at the same evening hour, this may be an indication of something abnormal even if, individually, all the accesses are seemingly normal. This is an illustration of a view from a single asset's perspective may not detect any problem but a view from another asset's perspective may indicate a hidden attack.

Figure 11:
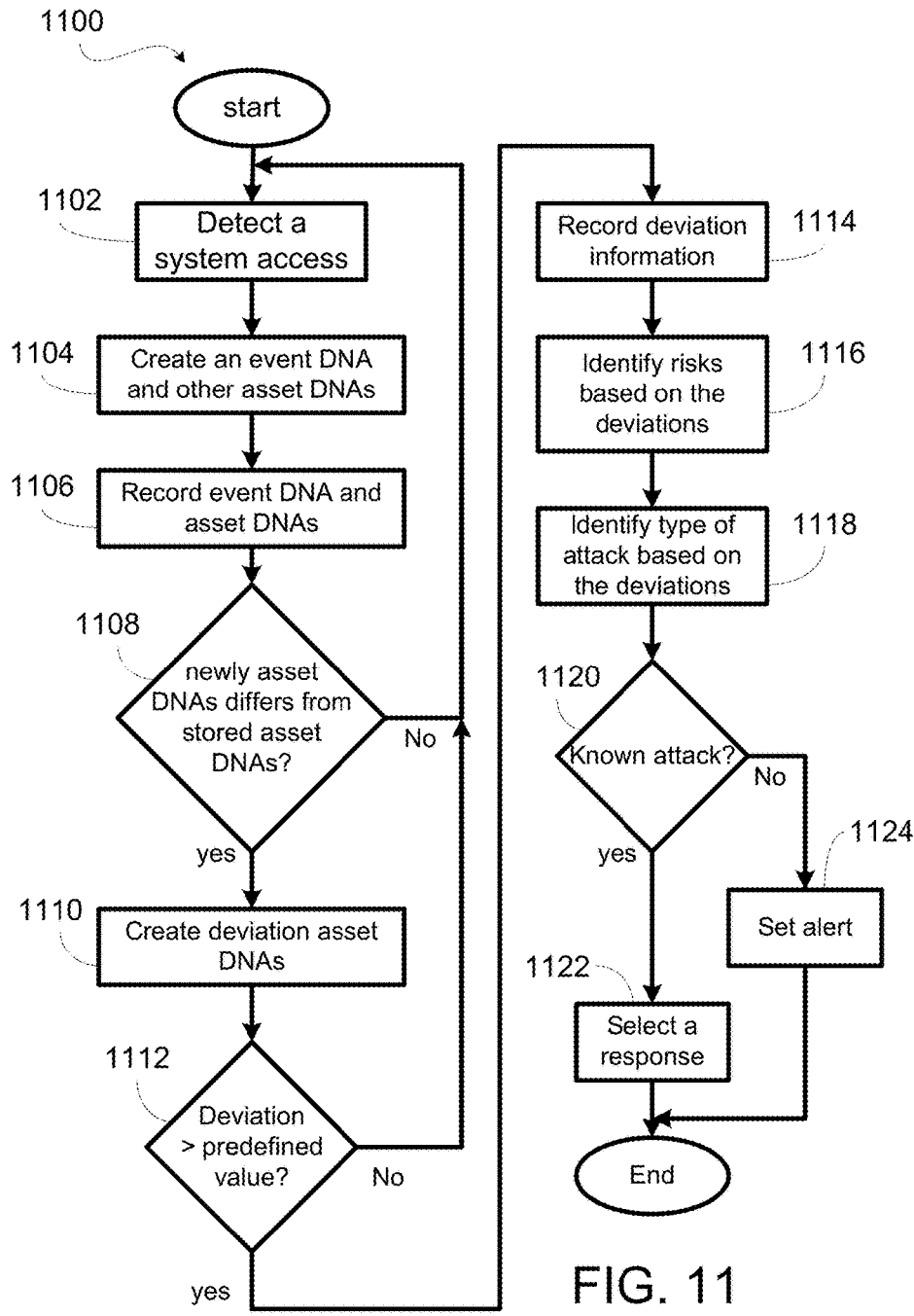
FIG. 11 illustrates a flowchart 1100 for identifying an attack.

The present invention helps a system to identify attacks when anomalies are detected in the system. An attack can be identified by the anomalies detected and the system can devise a proper response when the attack is identified. FIG. 11 illustrates a flowchart 1100 for identifying an attack. When a system access, for example a user making a data access from a database application, is detected, step 1102, an event DNA is created and associated with this event, step 1104. Other asset DNAs for each asset involved are also created and these asset DNAs and the event DNA are recorded, step 1106. For example, if the user retrieves an employee information from a human resource department database, a database DNA for the human resource database is created and a server DNA for the server where the human resource database is stored is also created. Each event DNA and asset DNA is assigned an identification.

Each newly created asset DNS is compared with previously stored asset DNAs for that asset, step 1108. For example, the user DNA for the user is compared with the stored user DNA for the particular user and the database DNA is compared with the stored database DNA for that particular database. If there is anomaly associated with this database DNA, the deviation between this database DNA and the previously stored database DNA is noted, step 1110. Deviations from other comparisons are also detected and stored. The deviation from a system access may trigger policy actions if the deviation violates a policy, step 1112. The deviations are recorded, step 1114.

Because of availability of stored user DNAs, it is possible to know whether a particular action by a user is normal, i.e., part of the user's DNA. If the user has accessed the human resource department's database before, then this particular access would not trigger any concern. However, if the previous accesses were from his office and now this access is from a computer from a library, then this deviation may trigger some concern.

An attack typically takes place in several events and each event may lead to deviation of many asset DNAs of many asset types. A risk management system can devised using the present invention. The risk management system quantifies aggregated risk from deviation of each asset DNA of each asset type according to user-defined policy rules, step 1116, and after all deviations are detected and identified, the system can identify the attack that is affecting the system, step 1118. The deviations that forms this aggregated risk serve as a signature of the attack and the identification of the type of the attack. If the attack is known, step 1120, because all the deviations are known, the system may have access to a counter measure to this attack, step 1122. If the attack is new and previously unknown, the system alerts the system administrator, step 1124, who can take proper action.

By the same deviation method of event DNA and asset DNA, rule DNA could also be used to model the relation for a given rule and associated assets and managed by the risk management system. In many situations, a single deviation may not trigger any alert on the system but deviations detected by many different asset DNAs can be an indication of an attack. The system can determine the triggering conditions through policies and rules.

The risk management system based on the present invention can compute risk from:

Rule Risk Level
Asset Sensitivity Level
Risk of New Asset DNA according to Asset Type
Risk of New Asset Association according to Asset Type
Risk of New Rule DNA
Risk of New Rule Association
Risk of New Event DNA Actions can be assigned according to the aggregated risk, and the aggregated risk may be computed from user defined formula, for example:

Risk=Sum($RuleRisk)+Sum($AssetRisk)+Sum($NewAssetDNARisk)+Sum($NewAssetAssociation)+Sum($NewRuleDNARisk)+Sum($NewRuleAssociation)+Sum($newEventDNA)

If each risk is computed by comparing a deviation with a predefined trigger level defined by a risk policy. Each individual risk may not exceed a predefined risk level and raise the alarm but the aggregated risk may cause the alarm.

The steps illustrated by FIGS. 2, 9, and 11 can be achieved by the control unit executing computer programs stored in the storage unit 1020. Furthermore, in the context of FIGS. 2, 9, and 11, the steps illustrated do not require or imply any particular order of actions. The actions may be executed in sequence or in parallel. The method may be implemented, for example, by operating portion(s) of a network device, such as a network router or network server, to execute a sequence of machine-readable instructions. The instructions can reside in various types of signal-bearing or data storage primary, secondary, or tertiary media. The media may comprise, for example, RAM (not shown) accessible by, or residing within, the components of the network device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media. The instructions when executed by a computer will enable the computer to perform the steps illustrated in FIGS. 2, 9, and 11.

The units illustrated in FIG. 10 are described based on their function and these units may have different physical implementation, such as the units may be combined or implemented in one or more computers.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated. The combinations of different features described in different embodiments in this specification are foreseeable and within the scope of the invention.

What is claimed is:

1. A method for identifying risks associated with information access requests in a system, by an apparatus comprising a monitoring unit, a non-volatile computer-readable memory, and a control unit, comprising:
   receiving, by the monitoring unit, an information access request;
   determining, by the control unit, whether the information access request involves a known entity or a new entity;
   retrieving, from the non-volatile computer-readable memory, a first set of user DNA data related to the known entity if the information access request involves a known entity;
   comparing the first set of user DNA data with data related to the information access request;
   creating deviation data if the first set of user DNA data differs from the data related to the information access request;
   updating the first set of user DNA data if the deviation data indicates a new association of the known entity with a new asset; and
   increasing a risk level associated with the deviation data if the deviation data exceeds a predefined trigger level in a policy,
   wherein the new asset comprises a file, a method, a server, a database, a command, or a user.

2. The method of claim 1 further comprising:
   creating, by the control unit, a second set of user DNA data based on a category of the new entity if the information access request involves the new entity
   comparing the second set of user DNA data with stored data related to other entities in the same category of the new entity; and
   creating deviation data if the second set of user DNA data differs from the data related to the other entities in the same category.

3. The method of claim 1 further comprising:
   determining whether the information access request involves a new relationship between two assets;
   recording the new relationship in the first set of user DNA data if the information access request involves a new relationship; and
   increasing a risk level associated with the first set of user DNA data if the information access request involves the new relationship.

4. The method of claim 3, wherein determining whether the information access request involves a new relationship between two assets further comprises checking relationships in the information access request against known relationships within the first set of user DNA data.

5. The method of claim 1 further comprising determining a type of attack based on the deviation data.

6. The method of claim 5 further comprising selecting a response based on the type of attack.

7. The method of claim 1, wherein the deviation data is an aggregated data from deviations detected from multiple entities.

8. An apparatus, for identifying risks associated with information access requests in a system, comprising:
   a network interface unit in communication with a network;
   a monitoring unit network in communication with the network interface and receiving information access request from the network;
   a control unit; and
   a non-volatile computer-readable memory in communication with the monitoring unit,
   wherein
   the control unit
      determines whether the information access request involves a known entity or a new entity,
      retrieves from the non-volatile computer-readable memory, a first set of user DNA data related to the known entity if the information access request involves a known entity,
      compares the first set of user DNA data with data related to the information access request,
      creates deviation data if the first set of user DNA data differs from the data related to the information access request,
      updates the first set of user DNA data if the deviation data indicates a new association of the known entity with a new asset; and
      increases a risk level associated with the deviation data if the deviation data exceeds a predefined trigger level in a policy,
   wherein the new asset comprises a file, a method, a server, a database, a command, or a user.

9. The apparatus of claim 8, wherein the control unit
   creates a second set of user DNA data based on a category of the new entity if the information access request involves a new entity,
   compares the second set of user DNA data with stored data related to other entities in the same category of the new entity, and
   creates deviation data if the second set of user DNA data differs from the data related to the other entities in the same category.

10. The apparatus of claim 8, wherein the control unit
   determines whether the information access request involves a new relationship between two assets,
   records the new relationship in the first set of user DNA data if the information access request involves a new relationship, and increases a risk level associated with the first set of user DNA data if the information access request involves the new relationship.

11. The apparatus of claim 8, wherein the control unit determines whether the information access request involves a new relationship between two assets further comprises checking relationships in the information access request against known relationships within the first set of user DNA data.

12. The method of claim 8, wherein the control unit further determines a type of attack based on the deviation data.

13. The method of claim 12, wherein the control unit further selects a response based on the type of attack.

14. The method of claim 8, wherein the deviation data is an aggregated data from deviations detected from multiple entities.

15. A non-transitory computer readable medium on which is stored a computer program for identifying risks associated with information access requests in a system, the computer program comprising computer instructions that when executed by a computing device with a monitoring unit, a non-volatile computer-readable memory, and a control unit causes the computing device to perform the steps for:

receiving, by the monitoring unit, an information access request;

determining, by the control unit, whether the information access request involves a known entity or a new entity;

retrieving, from the non-volatile computer-readable memory, a first set of user DNA data related to the known entity if the information access request involves a known entity;

comparing the first set of user DNA data with data related to the information access request;

creating deviation data if the first set of user DNA data differs from the data related to the information access request;

updating the first set of user DNA data if the deviation data indicates a new association of the known entity with a new asset; and increasing a risk level associated with the deviation data if the deviation data exceeds a predefined trigger level in a policy, wherein the new asset comprises a file, a method, a server, a database, a command, or a user.

16. The computer instructions of claim 15 further causing the computer device to perform the steps for:

creating, by the control unit, a second set of user DNA data based on a category of the new entity if the information access request involves a new entity;

comparing the second set of user DNA data with stored data related to other entities in the same category of the new entity; and creating deviation data if the second set of user DNA data differs from the data related to the other entities in the same category.

17. The computer instructions of claim 15 further causing the computer device to perform the steps for:

determining whether the information access request involves a new relationship between two assets;

recording the new relationship in the first set of user DNA data if the information access request involves a new relationship; and increasing a risk level associated with the first set of user DNA data if the information access request involves the new relationship.

18. The computer instructions of claim 17, wherein determining whether the information access request involves a new relationship between two assets further comprises checking relationships in the information access request against known relationships within the first set of user DNA data.

19. The method of claim 15 further causing the computer device to perform the step for determining a type of attack based on the deviation data.

20. The computer instructions of claim 19 further causing the computer device to perform the step for selecting a response based on the type of attack.

* * * * *